United States Patent
Collins et al.

(10) Patent No.: US 8,583,653 B2
(45) Date of Patent: Nov. 12, 2013

(54) METHODS AND SYSTEMS FOR DETERMINING CANDIDATES FOR A CUSTOM INDEX IN A MULTI-TENANT DATABASE ENVIRONMENT

(75) Inventors: Jesse Collins, San Francisco, CA (US); Arup Dutta, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 332 days.

(21) Appl. No.: 12/971,978

(22) Filed: Dec. 17, 2010

(65) Prior Publication Data

US 2011/0282881 A1  Nov. 17, 2011

Related U.S. Application Data

(60) Provisional application No. 61/334,421, filed on May 13, 2010.

(51) Int. Cl.
*G06F 7/00* (2006.01)
*G06F 17/30* (2006.01)

(52) U.S. Cl.
USPC ............................ 707/741; 707/696; 707/830

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,272,487 B1 * | 8/2001 | Beavin et al. ......................... 1/1 |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |

(Continued)

*Primary Examiner* — Wilson Lee
*Assistant Examiner* — Jessica N Le
(74) *Attorney, Agent, or Firm* — Blakely Sokoloff Taylor & Zafman LLP

(57) ABSTRACT

Methods and systems are described for determining candidates for a custom index in a multi-tenant database environment. In one embodiment, a method includes, capturing a query that is directed to a multi-tenant database, determining whether the captured query is a candidate for an additional filter, determining operators used by the captured query if the query is a candidate, determining data types of the database used by the captured query if the query is a candidate, determining whether there is a current filter for the operator and data types used by the captured query if the query is a candidate, selecting the captured query based on the determined operators, data types, and the determined current filters, and generating a custom index for the selected query.

20 Claims, 5 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,505,188 B1 * | 1/2003 | Ghazal et al. ............... 707/714 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229639 A1 * | 12/2003 | Carlson et al. ............... 707/100 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0124276 A1 * | 5/2007 | Weissman et al. ............... 707/2 |
| 2008/0052271 A1 * | 2/2008 | Lam ............................... 707/3 |
| 2009/0049288 A1 * | 2/2009 | Weissman .................... 712/245 |
| 2010/0036801 A1 * | 2/2010 | Pirvali et al. ..................... 707/2 |
| 2010/0057796 A1 * | 3/2010 | Brown et al. ................. 707/715 |
| 2010/0121868 A1 * | 5/2010 | Biannic et al. ................ 707/759 |
| 2010/0287206 A1 * | 11/2010 | Cain et al. .................... 707/802 |
| 2010/0287214 A1 * | 11/2010 | Narasayya et al. ........... 707/805 |
| 2011/0040744 A1 * | 2/2011 | Haas et al. .................... 707/713 |
| 2011/0055201 A1 * | 3/2011 | Burger ......................... 707/719 |

* cited by examiner

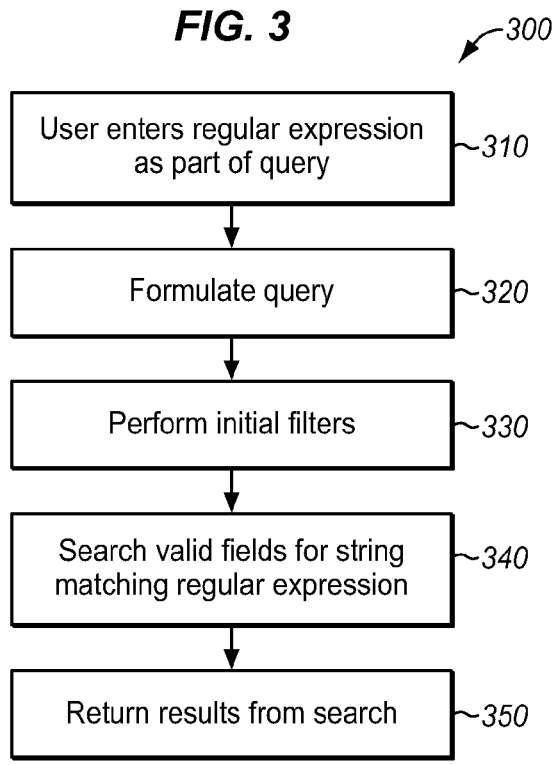
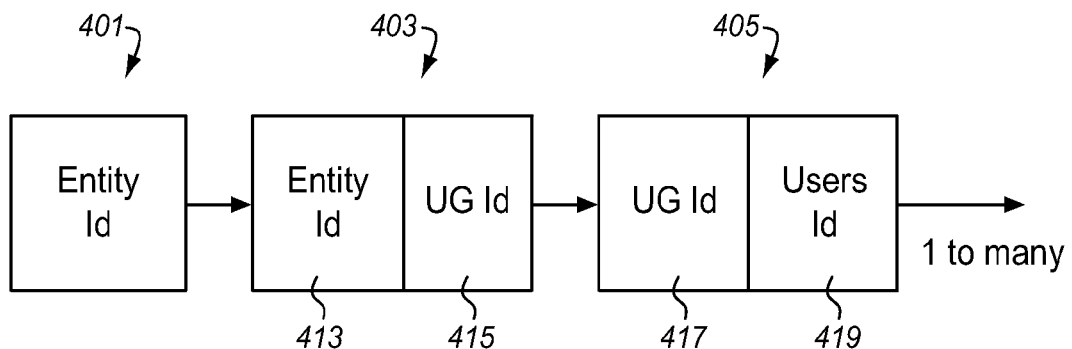

METHODS AND SYSTEMS FOR DETERMINING CANDIDATES FOR A CUSTOM INDEX IN A MULTI-TENANT DATABASE ENVIRONMENT

CLAIM OF PRIORITY

This application claims the benefit of U.S. Provisional Patent Application No. 61/334,421 entitled Methods and Systems for a Custom Index in a Multi-Tenant Database Environment, by Collins et al., filed May 13, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 12/262,744 entitled PREVENTING MISUSE OF DATABASE SEARCHES, by Hofhansl et al., filed Oct. 31, 2008; and U.S. Pat. No. 7,529,728 entitled QUERY OPTIMIZATION IN A MULTI-TENANT DATABASE SYSTEM, by Weissman et al., issued May 5, 2009.

FIELD OF THE INVENTION

The current invention relates generally to generating custom indexes to support queries from users or developers in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The reliable and efficient operation of queries on the database system to deliver information to a user has been and continues to be a goal of administrators of database systems.

Unfortunately, conventional database approaches might process a query relatively slowly if, for example, the query is inartfully drafted or the data is not well adapted to handling queries of a particular kind. A database system may also process a query relatively slowly if, for example, a relatively large number of users substantially concurrently access the database system.

BRIEF SUMMARY

In accordance with embodiments, there are provided mechanisms and methods for determining query candidates for custom indexes. These mechanisms and methods for determining query candidates can enable embodiments to provide more reliable and faster execution of queries both in development and in production.

While the present invention is described with reference to an embodiment in which techniques for validating queries are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3 is an operational flow diagram illustrating a high level overview of a technique for performing a database search in an embodiment;

FIG. 4 is a diagram of an example data model for sharing in an embodiment;

DETAILED DESCRIPTION

General Overview

Systems and methods are provided for determining query candidates for a custom index. These systems and methods are particularly valuable in the context of a multi-tenant database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for determining candidates for a custom index will be described with reference to example embodiments.

System Overview

Poorly indexed queries can cause severe performance issues in production when they are run frequently and on large data sets. For some queries the delay in performance may significantly affect the user experience. If a database enforces a time limit on queries, then there may be queries that are too slow to ever be completed. In a multitenant database system, there can be an extremely large variety of different potential queries. Some of the queries may cause negative impacts on the system or provide poor performance for tenant users. A flexible schema and powerful APIs (Application Programming Interface) can create further uncertainty by allowing different users to generate many new and different queries that have never before run on the database system.

According to some embodiments of the invention, a tool can be used to identify slow queries and then improve their performance by creating indexes to support the parameters of the query.

To validate the performance of a query, the query is first captured in some way. In the present description, the queries are directed to a multi-tenant database. However, the approaches described herein can also be applied to other types of databases. A query indexing system can be hooked into a complete test and validation system or into a database management system in several different places. Any one or more of these places or other places can be used to identify query run-time problems.

In one example, queries submitted in production, that is queries submitted by users are monitored. If a particular query runs slowly, or has slow performance, then it is flagged for later analysis. This analysis can include applying the tests and comparisons disclosed herein. Such an analysis after a query has already been applied allows a database system to be improved in a separate process without interfering with the use of the database. The improvements may include analyzing metadata and query formulation. Queries can be identified using a timer, using a time out log, or using a progress log.

Figure 1:
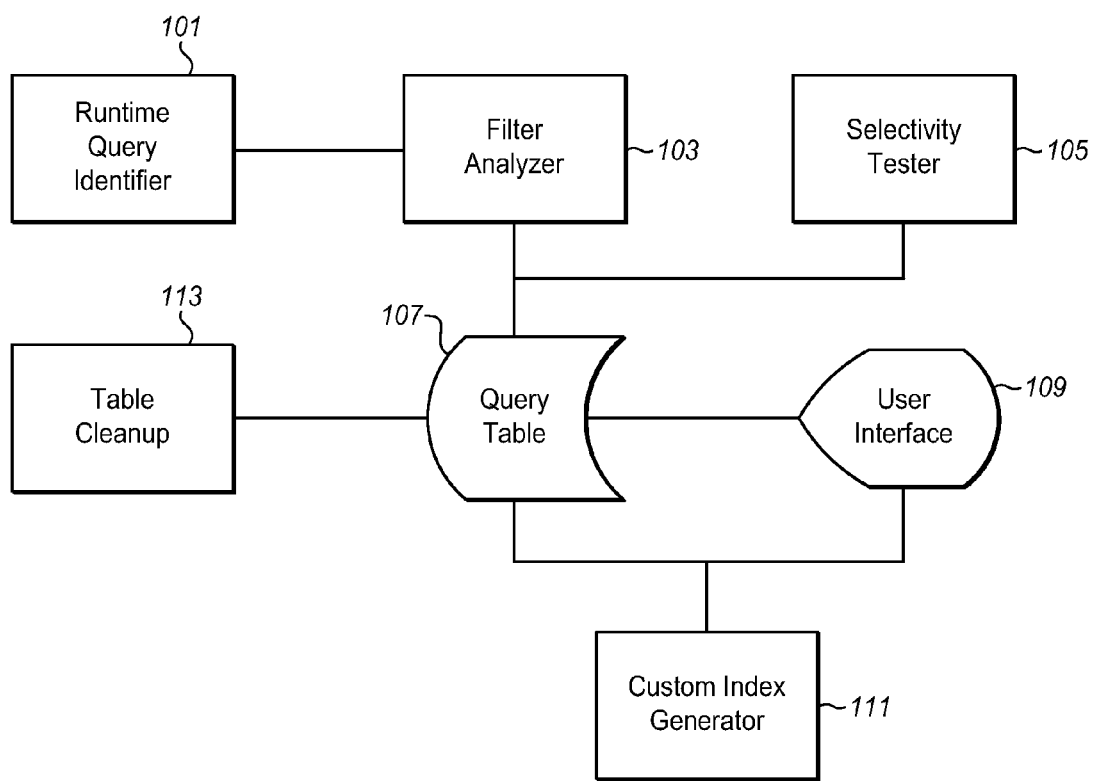
FIG. 1 is a block diagram of components for performing the present invention in an embodiment.

FIG. 1 shows a block diagram of a custom index recommender in one embodiment, to operate on incoming queries. Block 101 is a Runtime Query Identifier. The Identifier analyzes the running time of queries to identify potential candidate queries. These are queries that might benefit from a custom-index filter. The Query Identifier is able to identify slow queries with potentially selective filters on unindexed but indexable columns of the database. If the query took a significant amount of time to run (for example, more than 30 seconds, depending on the particular embodiment, then it may be considered a candidate. The Identifier may also handle queries that time out. When a query times out, the database connection is cancelled and it can no longer write/commit to the database. These queries can be identified by observing behavior or be performance summary list from the database or an application running on the database. The list can then be parsed to generate a list of candidate queries.

The identified candidates are also subjected to a Filter Analyzer 103. While the Query Identifier 101 is shown as operating before the Filter Analyzer, the order of operations may be reversed. If the query returns a relatively small number of rows, then it can be maintained as a candidate. If the query returns a large number of rows as query results, then the filter may not be selective and it cannot be identified as a candidate for a custom index. The Filter Analyzer can check to see the query has identified any potentially indexable filters. In one embodiment, all of the filters in the query can be inspected to see if they can be optimized. We can also take note of any filters that cannot easily be optimized, but that could be custom indexed and that could be modified to work with the custom index.

The Selectivity Tester 105 may be used to compile a table 107 of custom index candidates. This table may include an identifier for each query, the filters that the query uses and other information about the query. For example, the filter analyzer 103 may determine the operators and data types for the query. These may be included in the table. In addition, bibliographic information about each query may be included, such as the developer, the owner, the organization that uses it, etc. The table provides a convenient searchable storage mechanism for the other components of the system. The table may also be accessed by the filter analyzer to store results of the analysis. The data in the table is then accessible to a User Interface 109 and a Custom Index Generator 111.

The Selectivity Tester 105 may be operated as a background process that would run periodically and query the custom index candidate table 107 for a list of new filters to test. For each filter, it would run a query against the database to test the selectivity of the filter; this test query may be a sampled query rather than a complete query of the entire database. Exact selectivity information may not be required and scanning the full table for a large organization may be quite expensive. The selectivity test then provides a selectivity estimate that may be recorded in the custom index candidate table. Alternatively, a sampled query may be used to develop an initial estimate and then certain queries may be selected for a detailed or full query based on the estimate.

A user interface 109 may be provided to allow users to control or review process that are performed by the system. The user interface may allow access to the custom index candidate table and to the selectivity testing process. In one embodiment, an XML-based report type may be created. This report may be made available to qualified maintenance or query developers. The report type may be used to allow the qualified developers to query the custom index candidate table, with all of the filtering, grouping, etc. functionality available in reports. In one embodiment, the user interface may allow the developer to command the generation of a custom index for any of the queries in the report. The command may be received and acted upon by the Custom Index Generator 111 coupled to the User Interface. Links in the output could be used that would allow the developer to create custom indexes easily from the results view. The links may be configured to lead to another user interface that allows the developer to set the parameters and control each specific custom index that is generated for a query. Alternatively, the Custom Index Generator 111 of the system may use the data in the table to make autonomous automatic decisions about generating a custom index.

Finally, a Cleanup module 113 may be used to clear out old data. In one embodiment, the cleanup can be based simply on date information. For example, any rows from the custom index candidate table that hadn't been touched in 6 months could be deleted. For another example, any query that had not been run for 6 months could be deleted from the Query Table 107.

Figure 2:
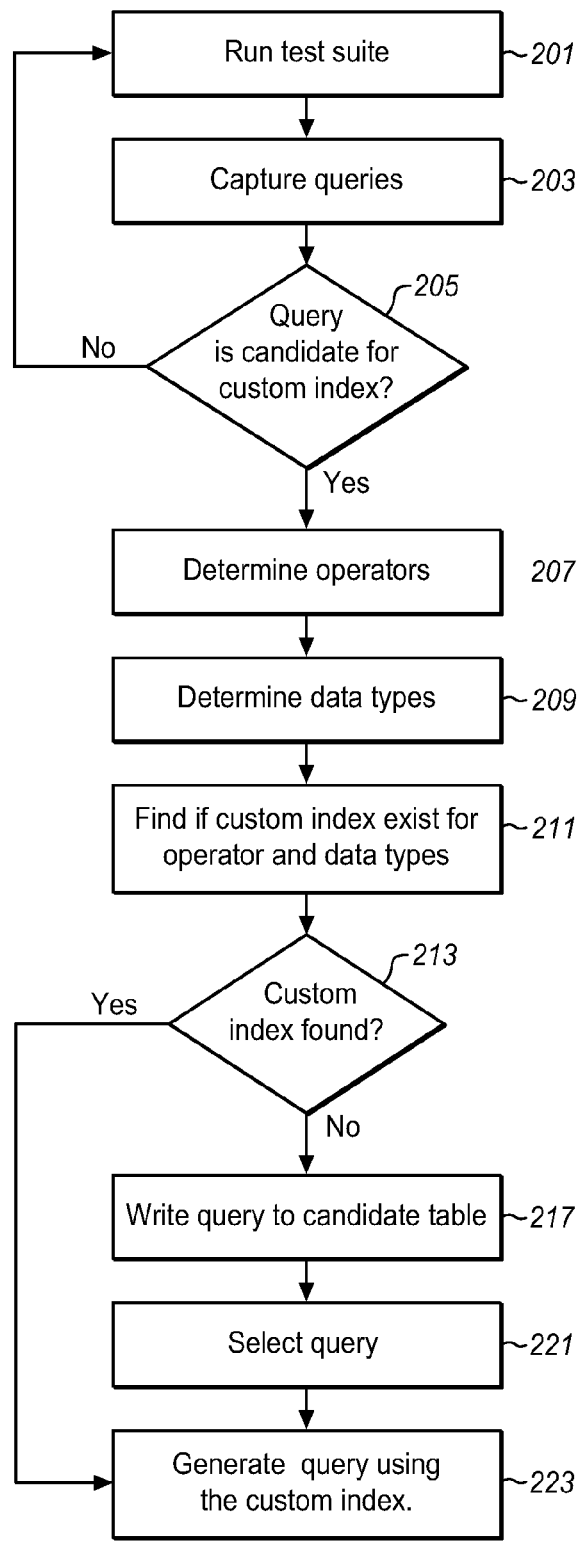
FIG. 2 is operational flow diagram illustrating a high level overview of technique for performing the present invention in an embodiment.

FIG. 2 shows a process flow diagram of an embodiment of the invention. The process may be performed by the architectural blocks of FIG. 1 and FIGS. 5 and 6. Not all of these operations are necessary and additional operations may be added, if desired. At block 201 of FIG. 2, an automated test suite runs a variety of different operations including running a varied set of logical queries. The automated test suite can perform many different functions to exercise the databases and to check user interfaces and applications. As an alternative, as mentioned above, there can be other sources of queries, such as user input, outside applications, maintenance systems, etc.

At block 203, the recommender system captures one or more of the queries. As mentioned above, the queries, can be captured before, during, or after execution. A variety of different criteria can be used to determine which queries to capture, or all of the queries can be captured. In an automated test suite application, all of the queries can be captured before execution without interfering with use of the underlying database. The queries may be in a variety of different formats, depending on the nature of the database and its supporting infrastructure. In the example described above, only slow queries or queries that filter poorly are captured.

At block 205, the query is analyzed to determine whether it is a candidate for a custom index. In one example, the query is a candidate if it runs slowly or if it times out. Additional criteria may also be used such as whether the query uses a filter or whether the query is used frequently and applies to a large database. In another example, the performance of the query can be measured as compared to other queries and queries that are inefficient may be selected.

The measure of performance or execution duration can be compared to the size of the organization that is using the query. If the query is being used by a large organization or an organization that has a large quantity of stored data in the database to which the query may be applied, then the query may be allowed more time to run. Alternatively, if the query is being applied to a smaller dataset, then it should be expected to run more quickly. The duration or performance of the query can be scaled by the size of the dataset. In one example, a ratio or scaling factor can be developed based on the size of the dataset or the size of the organization. This can be applied to any performance measure when determining whether the query is a candidate for a custom index.

In the analysis, the query may be run against a portion of the database to monitor its performance. Such a run may be done to test the selectivity of the filter of captured query and to develop a selectivity estimate for the captured query. These estimates may be compared to those for other queries to aid in determining which queries to select.

At block 207, the query is analyzed to determine the operators that it uses. Additive and comparative operators can be tabulated or listed. For use in determining whether to generate a custom index, operators that benefit from such an index can be tabulated. A query that has a large number of such operators is a better candidate than one does not. For example, if the query uses primarily negative operators, then it may not benefit from a custom index and it may be discarded as a candidate.

At block 209, the data types affected by the query are analyzed. This may include the columns used by the captured query, where the columns indicate the data field or the nature of the data. This may also include the rows used by the captured query, where the rows indicate organization, profile, or user. The data collected at operations 207 and 209 are useful for determining whether the query is a good candidate and are also useful when generating a custom query. All of this data may be stored in a query table or a custom index table or in any other suitable location and format.

At block 211, the filter and indexes used by the query are analyzed. In addition, an analysis is performed to determine if filters already exist for the identified operators and data types. At block 213, if a current index already exists and it is suitable for use by the query, then the query may be modified at block 223 to use the current index.

At block 217, the candidate query is written to the Query Table 107. When it is time to write a custom index, at block 221, the query is selected and at block 223, a custom index is generated based on determined operators, data types, and determined current filters.

The accuracy of a custom index can be improved by actually measuring the performance of a query after the custom index is generated and then comparing that to the original performance. The performance of a query can be measured and logged for later reference. The second execution can also be measured and compared to the first run to determine whether the query's performance has been improved and whether additional measures should be taken.

As additional operations to improve the functionality of the query it can also be analyzed and optimized for performance. Any queries with problems can be provided as an output to developers to inspect and correct the problems. The correction may include hint changes, database statistic changes, and SQL changes to the queries, among others.

Query Overview

By way of background, FIG. 3 is a flowchart illustrating a method 300 for performing a database search according to an embodiment of the present invention. A user may enter a regular expression in order to find particular fields of a database. Additional parameters for the search may request particular data associated (e.g. linked) with that field. For example, when a field is a column and/or row, the additional parameters may select particular data from that column.

At block 310, the user enters a regular expression. In one embodiment, this may be done by entering symbols and characters into a window of an application (e.g. application running on the database). In another embodiment, characters may be combined with actions (e.g. corresponding to particular symbols) chosen from lists (such as drop down lists).

At block 320, a query is formulated based on the regular expression that was entered. For example, an application server of a database system may formulate the query. The query may include other filters (e.g. additional parameters) entered by the user or imposed by the database system. For example, the system may allow access to only data to which the user is authorized.

At block 330, some filters may be imposed in order to limit the number of character strings searched. The application can apply the filters input by the user or imposed by the database system prior to using the regular expression. For example, the number of fields to be searched can be decreased by applying the filters.

At block 340, valid fields (i.e. fields passing the initial filters) are searched for a string matching the regular expression. Various mechanisms may be used to perform the search.

At block 350, the results are returned. In one embodiment, the matching strings may be aggregated and then returned all at once. In another embodiment, results associated with each matching string may be returned when that matching string is found. Additional filtering or searches may be performed using the matching strings. For example, data linked to a particular string may then be searched using filters (e.g. parameters) input by a user.

As an example of the operation of queries, one tenant of a multi-tenant database might be a company that employs a sales force where each salesperson uses the database system to manage their sales process. Thus, a user might maintain contact data, leads data, customer follow-up data, performance data, goals and progress data, etc., all applicable to that user's personal sales process. While each user's data might be separate from other users' data regardless of the employers of each user, some data might be organization-wide data shared or accessible by a plurality of users or all of the users for a given organization or tenant. Thus, there may be some data structures that are allocated at the tenant level while other data structures are managed at the user level.

User systems, developer systems and operations and management systems communicate with application servers to request and update system-level and tenant-level data from the multi-tenant database system. Typically this involves sending one or more queries to the database system. An application server or the user system can generate a specified query form such as one or more SQL statements that are designed to access the desired information. The database system then generates query plans to access the requested data from the database.

The query plan, as mentioned above, indicates how the query will be executed on the database. The query plan may include, for example, a search for a particular set of characters, i.e. a character string in a particular row or column of a database table (object). A table generally contains one or more data categories logically arranged as columns or fields in a viewable schema. Each row or record of a table contains an instance of data for each category defined by the fields. For example, a CRM (Customer Relationship Management) database may include a table that describes a customer with fields for basic contact information such as name, address, phone number, fax number, etc. Another table might describe a purchase order, including fields for information such as customer, product, sale price, date, etc.

As examples of different query plans, consider a query plan for a "boss" vs a "lower level employee." Differences in access and privilege levels can cause the same query to use a different plan. Consider a query of the form: "Show me all accounts that I can see" in a private account sharing model. An example of a data model for sharing appears in FIG. 4. In FIG. 4, a middle table 403 is a sharing table. It allows entity Id data from the first table 401 to be shared through the middle table to particular users. The middle table takes an entity Id 413 and generates a user/group Id 415. A final table 405 is a user/group "blowout". The final table describes which users are contained in a group, or are above a user in the role hierarchy (UG=User or Group)). Accordingly, the user/group Id 417 is blown out into individual user Ids 419. According to one aspect, for a "lower level employee" user, it is typically most advantageous to join these tables starting from the right, filtering on user Ids to form a temporary result of the rows that can be seen. Because the user can not see many rows, this will yield a relatively selective path. An example query is shown as Table 1.

TABLE 1

```
select a.name "ACCOUNT.NAME",
from sales.account a,
    (select distinct s.account_id
    from core.ug_blowout b, sales.acc_share s
        where s.organization_id = ?
        and b.organization_id = ?
        and b.users_id = ?
        and s.ug_id = b.ug_id
        and s.acc_access_level > 0) t,
    core.users u
where (t.account_id = a.account_id)
and (u.users_id = a.owner)
and (a.deleted = '0')
and (a.organization_id = ?)
and (u.organization_id = ?) )
```

Conversely for a "boss" user who can see most of the entity records in the organization, it is typically most advantageous to begin the query from the left and use a nested loop query plan onto the sharing table (acc_share), an example of which is provided in Table 2.

TABLE 2

```
select a.name "ACCOUNT.NAME",
from sales.account a,
core.users u
where (u.users_id = a.owner)
and (a.deleted = '0')
and (a.organization_id = ?)
and (exists (select 1 from core.ug_blowout b,
    sales.acc_share s
    where s.organization_id = ?
    and b.organization_id = ?
    and b.users_id = ?
    and s.ug_id = b.ug_id
    and s.acc_access_level > 0
    and s.account_id = a.account_id) )
and (u.organization_id = ?)
```

Note that the query of Table 2 in general runs in relatively constant (reasonable) time for all users in an organization. It may not be particularly fast since it must look at all top-level entity records, but it is suitable for a boss who can in fact see most records. The first "lower level employee" query runs much faster for users who in fact can not see many records, but it may run much slower for bosses who can see all records. Accordingly, the query plan can have a significant impact on the speed of a query and its efficiency.

System Overview

Figure 5:
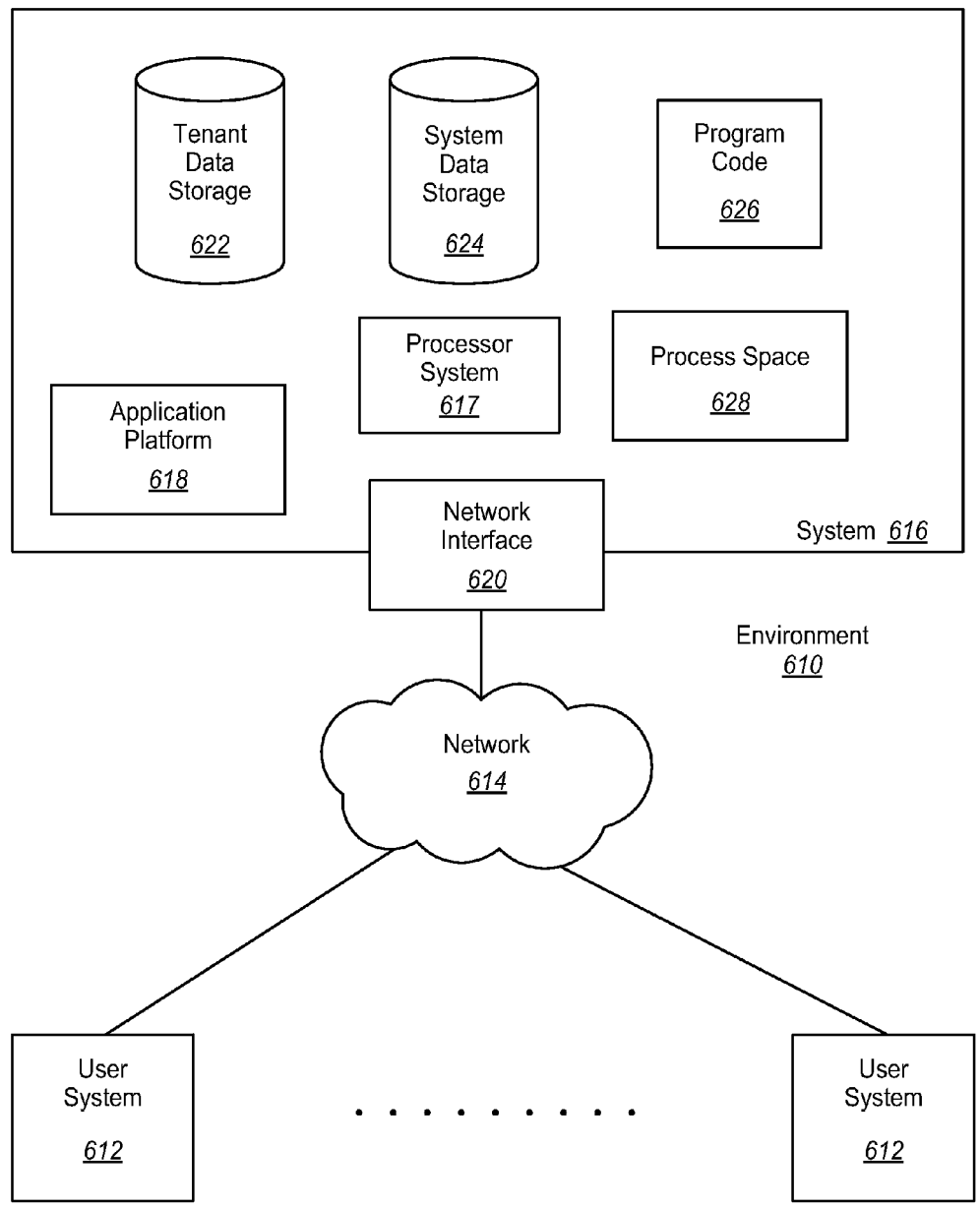
FIG. 5 illustrates a block diagram of an example of an environment wherein an on-demand database service might be used.

FIG. 5 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 5 (and in more detail in FIG. 5) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 5, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 6:
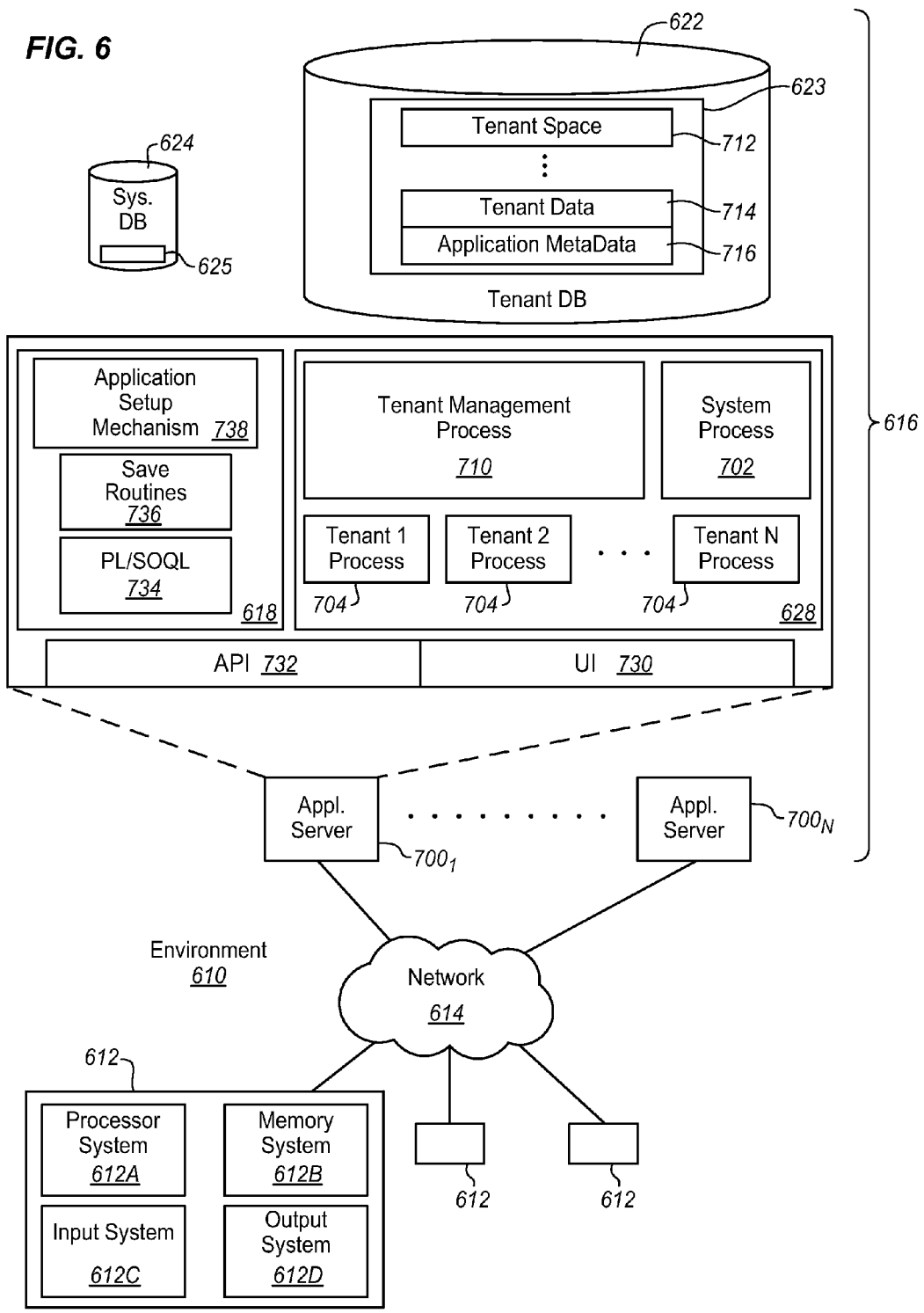
FIG. 6 illustrates a block diagram of an embodiment of elements of FIG. 5 and various possible interconnections between these elements.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 610. However, in FIG. 6 elements of system 616 and various interconnections in an embodiment are further illustrated. FIG. 6 shows that user system 612 may include processor system 612A, memory system 612B, input system 612C, and output system 612D. FIG. 6 shows network 614 and system 616. FIG. 6 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 6, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection.

For example, one application server 700 1 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method performed by a custom index recommender system, the method comprising:
   capturing a query that is directed to a multi-tenant database;
   determining whether the captured query is a candidate for a custom index by a query identification tool of the system;
   determining operators used by the captured query if the query is a candidate;
   determining data types of the database used by the captured query if the query is a candidate;

determining whether there is a current custom index for the operator and data types used by the captured query if the query is a candidate;

writing the captured query to a query table of custom index candidates of the system, the query table containing a plurality of queries that have been selected for a custom index, an identifier for each query, and filters used by each query;

selecting the captured query from the query table based on the determined operators, data types, and the determined current custom indexes; and generating a new custom index for the selected query based on the determined operators, data types, and the determined custom indexes.

2. The method of claim 1, wherein capturing a query comprises intercepting a query generated by a database user to be applied to the database.

3. The method of claim 1, wherein capturing a query comprises monitoring the performance of user queries to the database and identifying a user query with slow performance for capture.

4. The method of claim 1, wherein determining whether the captured query is a candidate comprises determining a duration for the captured query to run.

5. The method of claim 4, further comprising:
associating the captured query with an organization;
determining an amount of data for the organization; and
scaling the determined duration based on the amount of data for the organization.

6. The method of claim 1, wherein determining whether the captured query is a candidate comprises determining whether the query times out before completion.

7. The method of claim 1, wherein determining whether the captured query is a candidate further comprises considering how frequently the captured query is run on the database.

8. The method of claim 1, wherein determining whether the captured query is a candidate comprises running the query against the database to test the selectivity of the filter of the captured query, developing a selectivity estimate for the captured query and comparing the selectivity estimate to selectivity estimates for other queries.

9. The method of claim 8, wherein running the query comprises running the query against a portion of the database.

10. The method of claim 1, wherein determining the operators comprises scanning the filter for additive and comparative operators.

11. The method of claim 1, wherein determining a data type comprises determining columns of the database used by the captured query.

12. The method of claim 11, wherein determining whether there is a current filter comprises determining whether a current filter relates to the determined columns.

13. The method of claim 1, further comprising determining a tenant for the captured query and wherein determining whether there is a current custom index for the operator further comprises determining whether there is a custom index for the operator, data types, and tenant of the captured query.

14. A non-transitory machine-readable medium carrying one or more sequences of instructions for validating queries in a multi-tenant database system, which instructions, when executed by one or more processors, cause the one or more processors to carry out operations comprising:

capturing a query that is directed to a multi-tenant database;

determining whether the captured query is a candidate for a custom index;

determining operators used by the captured query if the query is a candidate;

determining data types of the database used by the captured query if the query is a candidate;

determining whether there is a current custom index for the operator and data types used by the captured query if the query is a candidate;

writing the captured query to a query table of custom index candidates of the system, the query table containing a plurality of queries that have been selected for a custom index, an identifier for each query, and filters used by each query;

selecting the captured query from the query table based on the determined operators, data types, and the determined current filters; and generating a new custom index for the selected query based on the determined operators, data types, and the determined custom indexes.

15. The non-transitory machine-readable medium as recited in claim 14, wherein the instructions further cause the one or more processors to carry out further operations comprising: associating the captured query with an organization; determining an amount of data for the organization; and scaling the determined duration based on the amount of data for the organization.

16. The non-transitory machine-readable medium as recited in claim 14, wherein the instructions for carrying out the step of determining whether the captured query is a candidate include instructions for determining whether the instruction times out before completion.

17. The non-transitory machine-readable medium as recited in claim 14, wherein the instructions for carrying out the step of determining whether the captured query is a candidate include instructions for considering how frequently the captured query is run on the database.

18. A custom index recommender hardware system, the system comprising:
a processor; and
one or more stored sequences of instructions which, when executed by the processor, cause the processor to implement processes comprising:
a run-time query identifier to capture a query that is directed to a multi-tenant database and to determine whether the captured query is a candidate for a custom index;
a filter analyzer to determine operators used by the captured query if the query is a candidate, to determine data types of the database used by the captured query if the query is a candidate, to determine whether there is a current custom index for the operator and data types used by the captured query if the query is a candidate, and to write the captured query to a query table of custom index candidates of the apparatus, the query table containing a plurality of queries that have been selected for a custom index, an identifier for each query, and filters used by each query; and
a custom index generator to select the captured query based on the determined operators, data types, and the determined current filters, and to generate a custom index for the selected query based on the determined operators, data types, and the determined custom indexes.

19. The system as recited in claim 18, further comprising a selectivity tester to run the query against the database to test the selectivity of the filter of the captured query, to develop a selectivity estimate for the captured query and to compare the selectivity estimate to selectivity estimates for other queries.

20. The system as recited in claim 19, wherein the selectivity tester first runs the query against only a portion of the database.

* * * * *